United States Patent
Han et al.

(10) Patent No.: US 12,058,681 B2
(45) Date of Patent: Aug. 6, 2024

(54) BUFFER STATUS REPORT FOR PACKET DUPLICATION

(71) Applicant: LENOVO (BEIJING) LIMITED, Beijing (CN)

(72) Inventors: Jing Han, Beijing (CN); Lianhai Wu, Beijing (CN); Xiaodong Yu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 157 days.

(21) Appl. No.: 17/044,938

(22) PCT Filed: Apr. 4, 2018

(86) PCT No.: PCT/CN2018/081993
§ 371 (c)(1),
(2) Date: Oct. 2, 2020

(87) PCT Pub. No.: WO2019/191961
PCT Pub. Date: Oct. 10, 2019

(65) Prior Publication Data
US 2021/0168840 A1    Jun. 3, 2021

(51) Int. Cl.
*H04W 72/21* (2023.01)
(52) U.S. Cl.
CPC .................. *H04W 72/21* (2023.01)
(58) Field of Classification Search
CPC ............ H04W 72/1284; H04W 72/21
See application file for complete search history.

(56) References Cited

U.S. PATENT DOCUMENTS

| | | | | |
|---|---|---|---|---|
| 2010/0115355 | A1* | 5/2010 | Hsu .................. | H04W 72/21 |
| | | | | 714/726 |
| 2017/0257876 | A1* | 9/2017 | Loehr .............. | H04W 28/0278 |
| 2018/0041410 | A1 | 2/2018 | Yi et al. | |
| 2018/0270700 | A1* | 9/2018 | Babaei .............. | H04W 72/042 |
| 2018/0317130 | A1* | 11/2018 | Jin .................. | H04W 24/10 |
| 2018/0324641 | A1* | 11/2018 | Tsai ................. | H04W 72/04 |
| 2018/0324642 | A1* | 11/2018 | Yu .................. | H04L 5/0053 |
| 2018/0368132 | A1* | 12/2018 | Babaei .............. | H04L 1/1819 |
| 2019/0230667 | A1* | 7/2019 | Loehr ............... | H04L 1/0078 |

(Continued)

FOREIGN PATENT DOCUMENTS

| | | |
|---|---|---|
| CN | 106455089 A | 2/2017 |
| CN | 107371260 A | 11/2017 |

(Continued)

OTHER PUBLICATIONS

PCT/CN2018-081993, "International Search Report and the Written Opinion of the International Search Authority" ISA/CN, State Intellectual Property Office of the P.R. China, Sep. 17, 2018, pp. 1-7.

(Continued)

*Primary Examiner* — Jasper Kwoh
(74) *Attorney, Agent, or Firm* — Kunzler Bean & Adamson (57) ABSTRACT

Methods and apparatuses for reporting buffer status are disclosed. A method of reporting buffer status, comprising: sending a control element including buffer status information for a logical channel group on which first packets transmit and buffer status information for a corresponding logical channel group on which duplicated packets transmit.

20 Claims, 7 Drawing Sheets

| | | | |
|---|---|---|---|
| Destination index$_1$ | LCG ID$_1$ | Buffer Size$_1$ | Oct 1 |
| Buffer Size$_1$ | Destination index$_{1d}$ | | Oct 2 |
| LCG ID$_{1d}$ | Buffer Size$_{1d}$ | | Oct 3 |
| Destination index$_2$ | LCG ID$_2$ | Buffer Size$_2$ | Oct 4 |
| Buffer Size$_2$ | Destination index$_3$ | | Oct 5 |
| LCG ID$_3$ | Buffer Size$_3$ | | Oct 6 |
| Destination index$_{3d}$ | LCG ID$_{3d}$ | Buffer Size$_{3d}$ | Oct 7 |
| Buffer Size$_{3d}$ | R R R R | | Oct 8 |

(56) References Cited

U.S. PATENT DOCUMENTS

| | | | | |
|---|---|---|---|---|
| 2019/0254062 A1* | 8/2019 | Wu | .................. | H04W 76/15 |
| 2020/0084669 A1* | 3/2020 | Belleschi | .......... | H04W 72/1263 |
| 2020/0288344 A1* | 9/2020 | Zhang | .................. | H04L 5/00 |
| 2020/0367093 A1* | 11/2020 | Belleschi | ............ | H04W 72/087 |
| 2020/0374744 A1* | 11/2020 | Liu | .................. | H04W 76/11 |
| 2020/0382988 A1* | 12/2020 | Zhao | ................ | H04W 28/0278 |
| 2021/0176661 A1* | 6/2021 | Kim | ................ | H04W 72/0486 |
| 2022/0014961 A1* | 1/2022 | Baek | .................. | H04W 28/02 |
| 2022/0201545 A1* | 6/2022 | Tesanovic | ......... | H04W 28/0278 |

FOREIGN PATENT DOCUMENTS

| | | |
|---|---|---|
| CN | 107438976 A | 12/2017 |
| EP | 3205170 A0 | 8/2017 |
| WO | 2016056968 A1 | 4/2016 |
| WO | 2018026238 A1 | 2/2018 |

OTHER PUBLICATIONS

Samsung, "Discussion on Packet Duplication", 3GPP TSG-RAN WG2 Meeting #98 R2-1705727, May 15-19, 2017, pp. 1-3.

\* cited by examiner

| Legacy BSR Info for LCG 1 |
|---|
| Duplicated packet buffer status for LCG 1 |
| Legacy BSR Info for LCG 2 |
| Duplicated packet buffer status for LCG 2 |
| Legacy BSR Info for LCG 3 |
| Duplicated packet buffer status for LCG 3 |
| Legacy BSR Info for LCG 4 |
| Duplicated packet buffer status for LCG 4 |

Figure 4

| Destination index$_1$ | LCG ID$_1$ | Buffer Size$_1$ | Oct 1 |
|---|---|---|---|
| Buffer Size$_1$ | Destination index$_{1d}$ | | Oct 2 |
| LCG ID$_{1d}$ | Buffer Size$_{1d}$ | | Oct 3 |

...

| Destination index$_N$ | LCG ID$_N$ | Buffer Size$_N$ |
|---|---|---|
| Buffer Size$_N$ | Destination index$_{Nd}$ | |
| LCG ID$_{Nd}$ | Buffer Size$_{Nd}$ | |

Figure 5

| Destination index₁ | LCG ID₁ | Buffer Size₁ | Oct 1 |
| Buffer Size₁ | Destination index₁d | | Oct 2 |
| LCG ID₁d | Buffer Size₁d | | Oct 3 |
| Destination index₂ | LCG ID₂ | Buffer Size₂ | Oct 4 |
| Buffer Size₂ | Destination index₃ | | Oct 5 |
| LCG ID₃ | Buffer Size₃ | | Oct 6 |
| Destination index₃d | LCG ID₃d | Buffer Size₃d | Oct 7 |
| Buffer Size₃d | R | R | R | R | Oct 8 |

Figure 6

| Legacy BSR Info for LCG 1 |
| Legacy BSR Info for LCG 2 |
| Legacy BSR Info for LCG 3 |
| Legacy BSR Info for LCG 4 |
| Duplicated packet buffer status of new LCG 1 |
| Duplicated packet buffer status of new LCG 2 |
| Duplicated packet buffer status of new LCG 3 |
| Duplicated packet buffer status of new LCG 4 |

Figure 7

| Legacy BSR Info for LCG 1 |
|---|
| Duplicated packet buffer status of new LCG 1 |
| Legacy BSR Info for LCG 2 |
| Duplicated packet buffer status of new LCG 3 |
| Legacy BSR Info for LCG 3 |
| Duplicated packet buffer status of new LCG 4 |
| Legacy BSR Info for LCG 4 |
| Duplicated packet buffer status of new LCG 2 |

Figure 8

| Destination index$_1$ | LCG ID$_1$ | Buffer Size$_1$ | Oct 1 |
|---|---|---|---|
| Buffer Size$_1$ | Destination index$_2$ | | Oct 2 |
| LCG ID$_2$ | Buffer Size$_2$ | | Oct 3 |

| Destination index$_{N-1}$ | LCG ID$_{N-1}$ | Buffer Size$_{N-1}$ |
|---|---|---|
| Buffer Size$_{N-1}$ | Destination index$_N$ | |
| LCG ID$_N$ | Buffer Size$_N$ | |
| Destination index$_{d1}$ | LCG ID$_{d1}$ | Buffer Size$_{d1}$ |
| Buffer Size$_{d1}$ | Destination index$_{d2}$ | |
| LCG ID$_{d2}$ | Buffer Size$_{d2}$ | |

| Destination index$_{dN}$ | LCG ID$_{dN}$ | Buffer Size$_{dN}$ | | | |
|---|---|---|---|---|---|
| Buffer Size$_{dN}$ | R | R | R | R | |

BUFFER STATUS REPORT FOR PACKET DUPLICATION

FIELD

The subject matter disclosed herein generally relates to wireless communications, and more particularly relates to reporting buffer status.

BACKGROUND

The following abbreviations are herewith defined, some of which are referred to within the following description: Third Generation Partnership Project (3GPP), Downlink (DL), Evolved Node B (eNB), European Telecommunications Standards Institute (ETSI), Frequency Division Duplex (FDD), Frequency Division Multiple Access (MDMA), Long Term Evolution (LTE), Next Generation Node B (gNB), New Radio (NR), Negative Acknowledgement (NACK), Orthogonal Frequency Division Multiplexing (OFDM), Single Carrier Frequency Division Multiple Access (SC-FDMA), System Information (SI), Signal to Interference plus Noise Ratio (SINR), Transport Block (TB), Time-Division Duplex (TDD), Time Division Multiplex (TDM), User Entity/Equipment (Mobile Terminal) (UE), Uplink (UL), Universal Mobile Telecommunications System (UMTS), Worldwide Interoperability for Microwave Access (WiMAX), Transmission Configuration Indication (TCI), Physical Downlink Control Channel (PDCCH), Block Error Rate (BLER), Media Access Control (MAC), physical (PHY), Random Access Channel (RACH), Physical Random Access Channel (PRACU), Single Side Band (SSB), Radio Resource Control (RRC), Control Resource Set (CORSET or CORESET), Cell Radio Network Temporary Identifier (C-RNTI), Cyclic Redundancy Check (CRC), Quasi co-location (QCL), Physical Downlink Shared Channel (PDSCH), Control Element (CE), Transmit (TX), Receive (RX), Vehicle to Everything (V2X), buffer status report (BSR), Proximity-based service (ProSe), ProSe Per-Packet Priority (PPPP), Carrier Aggregation (CA), logical channel (LC), logical channel group (LCC).

For carrier aggregation, packet duplication on sidelink is enabled to enhance the reliability of sidelink packet transmission. As for the packet duplication, sidelink packet duplication on a single carrier is not supported. This means that the packets and duplicated packets need to be transmitted in different carriers. When V2X (Vehicle to Everything) UE is configured in scheduling mode, i.e. mode 3, packet duplication function on sidelink is controlled by eNB. Thus the eNB needs to know the buffer status of the duplicated packets of logical channels that have activated duplication in a logical channel group, so that the eNB can schedule packets and duplicated packets on different carriers and allocate suitable resources. However, existing BSR (buffer status report) mechanism for resource requesting is based on service priority, i.e. PPPP (ProSe Per-Packet Priority), and therefore cannot reflect buffer statuses of packets and duplicated packets separately.

BRIEF SUMMARY

Methods and apparatuses for reporting buffer status are disclosed.

In one embodiment, a method of reporting buffer status, comprising: sending a control element including buffer status information for a logical channel group on which first packets transmit and buffer status information for a corresponding logical Channel group on which duplicated packets transmit.

In one embodiment, in the condition that the duplicated packets arrive at a buffer for at least one logical channel contained in the corresponding logical channel group, the buffer status information for the corresponding logical channel group is included. If the buffer status information for the logical channel group and the corresponding logical channel group do not fill full bytes of the control element, reserved bits are added to the control element. The logical channel group and the corresponding logical channel group are associated with the same ProSe destination.

In some embodiment, the control element includes buffer status information for a plurality of the logical channel groups on which the original packets transmit and buffer status information for a plurality of the corresponding logical channel groups on which the duplicated packets transmit. If the number of bits in the UL grant is not enough for the size of the buffer status information for both the plurality of the logical channel groups and the plurality of the corresponding logical channel groups, the control element includes as much buffer status information possible. In particular, if the buffer status information for only the logical channel group or only the corresponding logical channel group can be included in the control element, the buffer status information for both the logical channel group and the corresponding logical channel group are not included in the control element.

In some embodiment, logical channels are grouped into the corresponding logical channel groups according to their destinations and in consideration of service priority configuration. The buffer status information for the corresponding logical channel group includes destination index, LCG ID, and buffer size. The destination index of the buffer status information for the corresponding logical channel group is the same as destination index of the buffer status information for the logical channel group with the same priority configuration. The LCG ID of the buffer status information for the corresponding logical channel group is the same as LCG ID of the buffer status information for the logical channel group with the same priority configuration. The buffer size of the buffer status information for the corresponding logical channel group indicates a total amount of duplicated data available for transmission across all of logical channels that have activated duplication in the logical channel group.

In some embodiment, logical channels are grouped into the corresponding logical channel groups according to their destinations and in consideration of service reliability configuration, in the control element, the buffer status information for all of the corresponding logical channel groups are positioned after the buffer status information for all of the logical channel groups. In the control element, the buffer status information for the logical channel groups and the corresponding logical channel groups are prioritized according to service priorities of the logical channels contained in the logical channel groups and the corresponding n) logical channel groups. In particular, the buffer status information for the logical channel group and the corresponding logical channel group with higher service priority are positioned in front, and the buffer status information for the logical channel group is positioned in front of the buffer status information for the corresponding logical channel group with the same destination index. The buffer status information for the corresponding logical channel group includes destination index, LCG ID, and buffer size. At least one logical channel is included in both the corresponding logical channel group and the logical channel group. The buffer size of the buffer status information for the corresponding logical channel group indicates a total amount of duplicated data available for transmission across all of logical channels that activated duplication in the logical channel group. The LCG ID of the buffer status information for the corresponding logical channel group is based on eNB configuration.

In some embodiment, logical channels are grouped into the corresponding logical channel groups according to eNB configuration.

In another embodiment, a remote unit, comprising: a transmitter that sends a control element including buffer status information for a logical channel group on which first packets transmit and buffer status information for a corresponding logical channel group on which duplicated packets transmit.

In yet another embodiment, a method of reporting buffer status, comprising: receiving a control element including buffer status information for a logical channel group on which first packets transmit and buffer status information for a corresponding logical channel group on which duplicated packets transmit.

In further embodiment, a base unit, comprising: a receiver that receives a control element including buffer status information for a logical channel group on which first packets transmit and buffer status information for a corresponding logical channel group on which duplicated packets transmit.

BRIEF DISCLOSURE OF THE DRAWINGS

A more particular description of the embodiments briefly described above will be rendered by reference to specific embodiments that are illustrated in the appended drawings, Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices, Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory ("RAM"), read-only memory ("ROM"), erasable programmable read-only memory ("EPROM" or "Flash Memory"), portable compact disc read-only memory ("CD-ROM"), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The description of elements in each figure may refer to elements of proceeding figures. Like numbers refer to like elements in all figures, including alternate embodiments of like elements.

Figure 1:
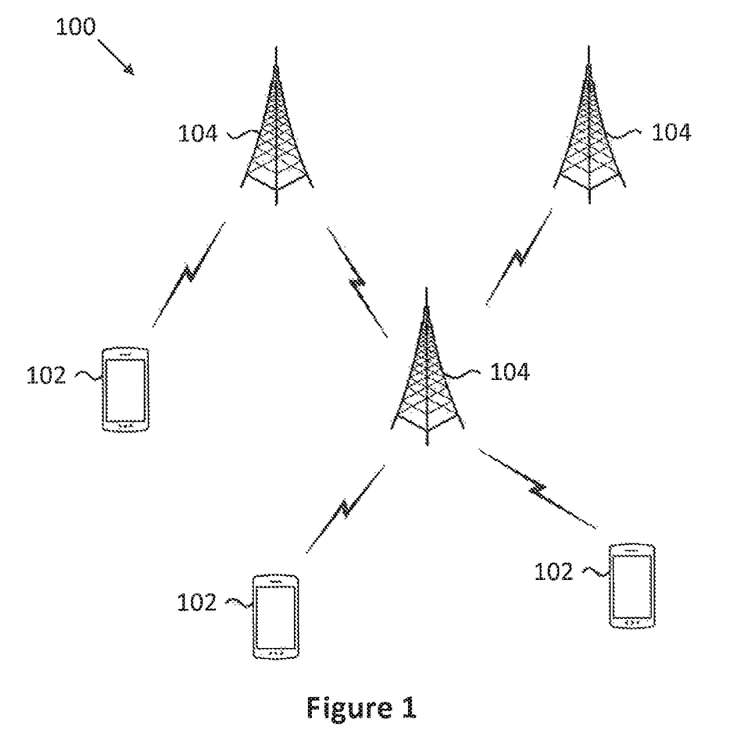
FIG. 1 is a schematic block diagram illustrating one embodiment of a wireless communication system for reporting buffer status.

FIG. 1 depicts an embodiment of a wireless communication system 100 for reporting buffer status. In one embodiment, the wireless communication system 100 includes remote units 102 and base units 104. Even though a specific number of remote units 102 and base units 104 are depicted in FIG. 1, one skilled in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, UE, user terminals, a device, or by other terminology used in the art.

The remote units 102 may communicate directly with one or more of the base units 104 via UL, communication signals. A remote unit may connect to the base unit with one or more cells.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR (5G). More generally, however, the wireless communication system 100 may implement some other open or proprietary communication protocol.

The base units 104 may serve a number of remote units 102 within a serving area, for example, a cell (or a cell sector) or more cells via a wireless communication link. The base units 104 transmit DL communication signals to serve the remote units 102 in the time, frequency, and/or spatial domain.

Figure 2:
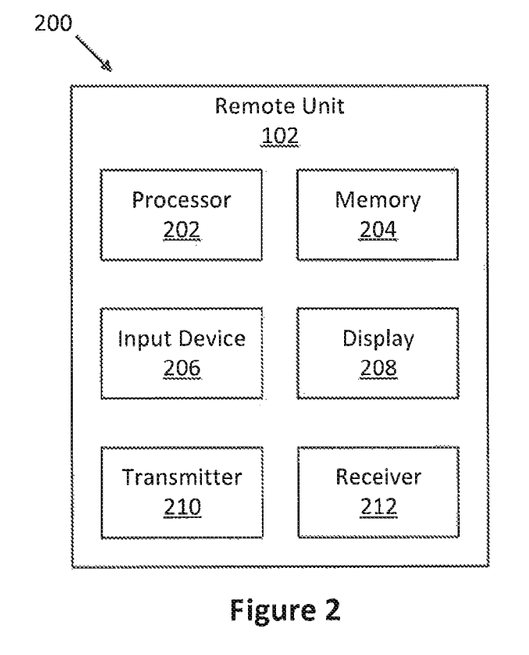
FIG. 2 is a schematic block diagram illustrating one embodiment of an apparatus that may be used for reporting buffer status.

FIG. 2 depicts one embodiment of an apparatus 200 that may be used for reporting buffer status. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touch screen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touch screen or similar touch-sensitive display. In some embodiments, the input device 206 includes a touch screen such that text may be input using a virtual keyboard displayed on the touch screen and/or by handwriting on the touch screen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touch screen or similar touch-sensitive display. In other embodiments, the display 208 may be located near the input device 206.

The transmitter 210 is used to provide UL communication signals to the base unit 104 and the receiver 212 is used to receive DL communication signals from the base unit 104.

In various embodiments, the transmitter 210 and the receiver 212 may transmit and receive resources via different cells. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
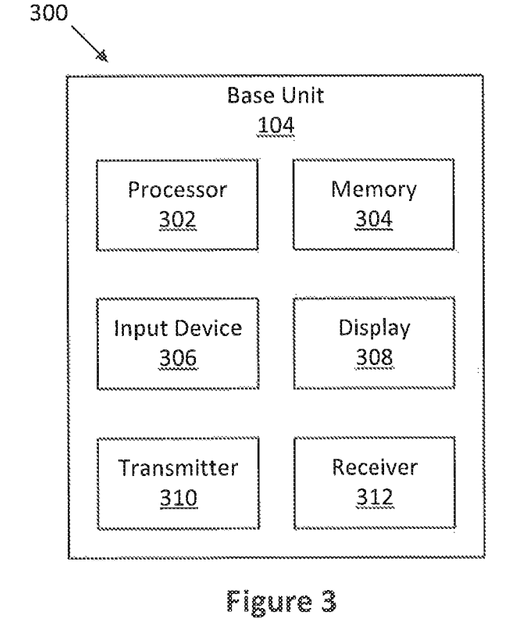
FIG. 3 is a schematic block diagram illustrating one embodiment of an apparatus that may be used for reporting buffer status.

FIG. 3 depicts one embodiment of an apparatus 300 that may be used for reporting buffer status. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Different services are transmitted via different logical channels. Different services have different priorities. Therefore, the logical channels for transmitting different services may be grouped as different logical channel groups depending on different priorities of the services transmitted thereon. For example, there may be four logical channel groups (LCGs): LCG1, LCG2, LCG3 and LCG4 with decreasing priorities. All of the logical channels (LCs) in one LCG (any one of LCG1, LCG2, LCG3 and LCG4) have the same priority.

In mode 3, the eNB is responsible for controlling communications of the UEs. In order to make appropriate scheduling, the eNB needs to know the size of the data to be transmitted via LCGs. This is accompanied by reporting buffer status from the UE to the eNB. The buffer status is sent from the UE to the eNB in a BSR MAC CE ("Buffer Status Report" "Media Access Control" "Control Element"). When packets to be transmitted on a LCG arrive at a buffer for the LCG, the buffer status is sent in the BSR MAC CE from the UE to the eNB.

Figure 4:
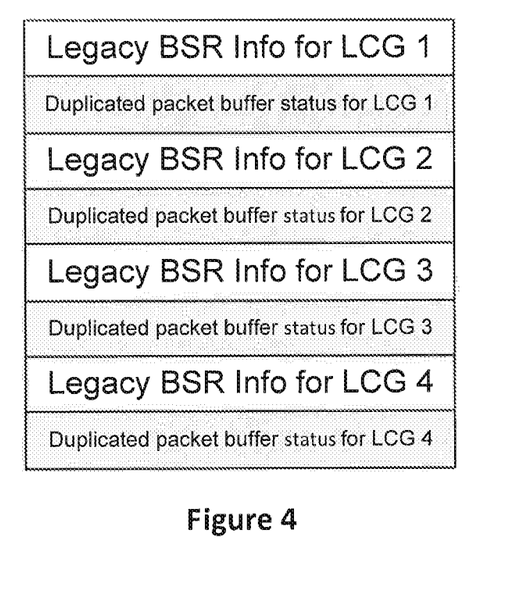
FIG. 4 is a schematic diagram illustrating a BSR MAC CE containing buffer status according to the first embodiment.

Each buffer status indicates the buffer size of each LCG. The BSR MAC CE structure includes "destination index", "LCG ID" and "buffer size" for each LCG. For example, in the condition of four LCGs (LCG1, LCG2, LCG3 and LCG4), the BSR MAC CE structure includes four buffer statuses, FIG. 4 is a schematic figure illustrating a BSR MAC CE containing buffer status of both the first packets and the duplicated packets according to the first embodiment. The first packets contain the data to be transmitted on a LCG. The duplicated packets contain the data to be transmitted on the LCG (or the corresponding LCG) in duplication in another carrier.

In FIG. 4, each "Legacy BSR Info" represents the buffer status for each LCG. As shown in FIG. 4, four "Legacy BSR Info" for LCG1, LCG2, LCG3 and LCG4 are contained in the MAC CE for reporting buffer status.

In addition, the MAC CE for reporting buffer status also contains four "duplicated packet buffer status" for LCG1, LCG2, LCG3 and LCG4 (or corresponding LCG1, corresponding LCG2, corresponding LCG3 and corresponding LCG4).

Each "duplicated packet buffer status" is added after each "Legacy BSR Info". The "duplicated packet buffer status" is used to report the buffer size for the corresponding logical channel group on which the duplicated packets transmit.

For carrier aggregation, packet duplication on sidelink is enabled to enhance the reliability of sidelink packet transmission. Packet duplication means that the same packet is transmitted via different carriers, so that the reliability of receiving the packet is enhanced. Therefore, whether a packet is transmitted in duplication depends on the requirement of the reliability of the packets (or of the service).

Different services that are transmitted in different logical channels have different requirements of reliability. In other words, different LCs have different requirements of reliability.

Therefore, different LCs in the same LCG may have different requirements of reliability. Suppose three LCs (LC1, LC2 and LC3), that have the same priority, are contained in one LCG; and LC1, LC2 and LC3 have different requirements of reliability. Suppose LC1, which has the highest requirement of reliability, is necessary to be transmitted in duplication; while LC2 and LC3, depending on their requirements of reliability, are not necessary to be transmitted in duplication. Therefore, for the LCG that contains LC1, LC2 and LC3, only LC1 is necessary to be transmitted in duplication, while LC2 and LC3 are not necessary to be transmitted in duplication. Therefore, in the condition that the duplicated packets arrive at a buffer for LC1, the buffer status information for the corresponding logical channel group is included.

As described above, in mode 3, the eNB is responsible for controlling communications of the LTEs. In order to make appropriate scheduling, the eNB is necessary to know the buffer status (buffer size). Traditionally, only the buffer size for a whole LCG is reported to the eNB. However, the buffer size of the corresponding LCG that is necessary to be transmitted in duplication (in the previous example, the buffer size of LC1) may be different from the buffer size of the whole LCG (the buffer size of all of the LC1, LC2 and LC3), Therefore, according to an embodiment, the "duplicated packet buffer status" is used to report the buffer size of all of the logical channels that have activated Packet duplication in the logical channel group.

As discussed in earlier example, for the "Legacy BSR Info for LCG1", the LCG1 is practically composed of LC1, LC2 and LC3, while the legacy buffer status for the LCG1 indicates a total amount of data available for transmission of all of LC1, LC2 and LC3. On the other hand, for the "Duplicated packet buffer status for LCG1", although the LCG1 is also practically composed of LC1, LC2 and LC3, the duplicated buffer status for LCG1 indicates a total amount of duplicated data available for transmission of all of logical channels that have activated duplication (i.e. of only LC1) in the logical channel group. Therefore, the LCG1 in "Legacy BSR Info for LCG1" and the LCG1 in "Duplicated packet buffer status for LCG1" are not exactly the same. To make differentiation, as appropriate, the LCG1 in "Legacy BSR Info for LCG1" and the LCG1 in "Duplicated packet buffer status for LCG1" are corresponding, for example, the LCG1 in "Legacy BSR Info for LCG1" may be referred to as LCG1 (or LCG) while the LCG1 in "Duplicated packet buffer status for LCG1" may be referred to as corresponding LCG1 (or corresponding LCG), or vice verse.

Figure 5:
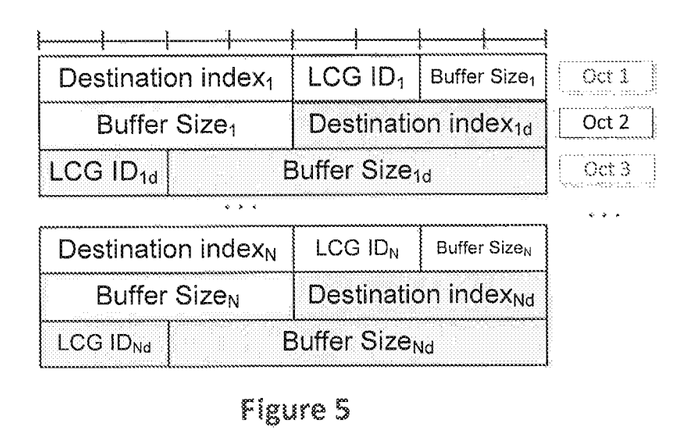
FIG. 5 is a schematic diagram illustrating a detailed BSR MAC CE format containing buffer status for both LCGs and corresponding LCGs according to the first embodiment.

As shown in FIG. 4, the "duplicated packet buffer status for LCG1" is positioned after the "Legacy BSR Info for LCG1"; the "duplicated packet buffer status for LCG2" is positioned after the "Legacy BSR Info for LCG2"; the "duplicated packet buffer status for LCG3" is positioned after the "Legacy BSR Info for LCG3"; and the "duplicated packet buffer status for LCG4" is positioned after the "Legacy BSR Info for LCG4", FIG. 4 shows all of "duplicated packet buffer status for LCG1", "duplicated packet buffer status for LCG2", "duplicated packet buffer status for LCG3" and "duplicated packet buffer status for LCG4". On the other hand, duplicated packet buffer status for a particular LCG is only present when there has available duplicated packets for transmission of activated duplicated logical channel(s) in the particular LCG. That is to say, in the condition that none of the LCs in the particular LCG is necessary to be transmitted in duplication, it is unnecessary to include the duplicated packet buffer status for said particular LCG, FIG. 5 shows the detailed BSR MAC CE format containing buffer status for both LCGs and corresponding LCGs according to the first embodiment. In FIG. 5, each row represents one byte (i.e. eight bits). In FIG. 5, "Oct" means "Octet", i.e. a byte that is composed of eight bits. Both "Legacy BSR. Info" and "duplicated packet buffer status" includes information of twelve bits. In particular, the "Legacy BSR Info" fields include destination index (4 bits), LCG ID (2 bits), and buffer size (6 bits); while the "duplicated packet buffer status" also includes destination index (4 bits), LCG ID (2 bits), and buffer size (6 bits).

The destination index for duplicated packet buffer status is the same as destination index of the corresponding legacy LCG (i.e. destination index$_{1d}$ is the same as destination index$_{1d}$). Traditionally, LCG is defined per ProSe (Proximity-based Services) Destination. That is, one LCG is associated with one ProSe Destination. In the embodiment, since the destination index$_{1d}$ is the same as destination index$_1$, two LCGs (i.e. a LCG and a corresponding LCG) are associated with the same ProSe Destination.

The LCG ID of duplicated packet buffer status is also the same as LCG ID of the corresponding legacy LCG (i.e. LCG ID$_{1d}$ is the same as LCG ID$_1$). The same destination index and LCG ID is used to indicate the following buffer size is for duplicated packet buffer size of logical channels that have activated duplication.

From the point of the view of the eNB, when receiving a particular destination index and LCG ID for the first time, the eNB knows that the following buffer size is for the "Legacy BSR Info", and when receiving the same particular destination index and LCG ID for the second time, the eNB knows that the following buffer size is for the "duplicated packet buffer status".

The buffer size of duplicated packet buffer status is the total amount of data available across all logical channels that activated duplication in a LCG to a ProSe destination.

As a whole, the destination index$_{1d}$ is the same as the destination index$_1$; the LCG ID$_{1d}$ is the same as the LCG ID$_1$; and the Buffer Size$_1$ is the total amount of data across all logical channels in a LCG while the Buffer Size$_{1d}$ is the total amount of data available across all logical channels that have activated duplication in the LCG (or a corresponding LCG).

The number of bits (or bytes) that can be used to transmit the BSR information is determined by UL grant. If the number of bits in the UL grant is not enough for the size of a MAC CE for reporting buffer status, it is preferable to report a truncated BSR containing as much buffer status as possible, unless buffer status for both the LCG and the corresponding LCG cannot be contained together. This is the truncated BSR rule, which means that if the duplicated packet buffer status of a specific LCG cannot be contained because of limited UL grant size, the legacy buffer status of the corresponding LCG is not included either. This is for the purpose of avoiding misunderstanding in eNB that there is no duplicated packet for the specific LCG.

Figure 6:
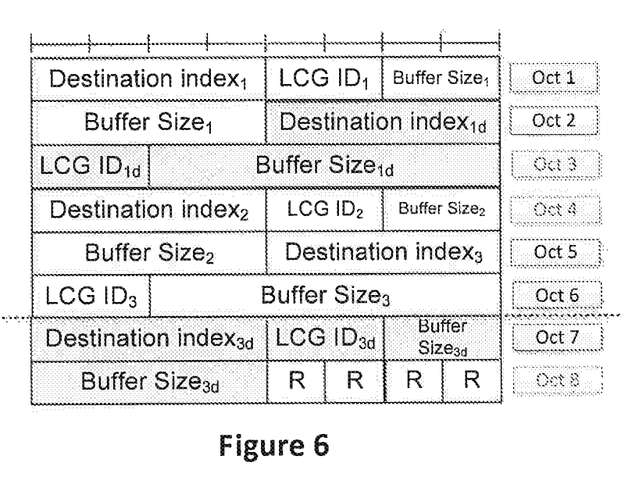
FIG. 6 is a schematic diagram illustrating the truncated BSR rule according to the first embodiment.

FIG. 6 shows an example of the truncated BSR rule. In FIG. 6, if the full BSR information contains 8 bytes, but UL grant is only 6 bytes, then based on the truncated BSR rule, both LCG3 (i.e. Destination index$_3$, LCG ID$_3$, buffer size) and LCG3d (i.e. Destination index$_{3d}$, LCG ID$_{3d}$, buffer size$_{3d}$) are not included in BSR MAC CE, although there is enough space for LCG3. If the LCG3 is included while LCG3d is not included, the eNB would misunderstand that all of packets transmitted on LCG3 do not need to be transmitted in duplication.

FIG. 6 also shows reserved bits. As both "Legacy BSR Info" and "duplicated packet buffer status" includes information of twelve bits, in consideration that the MAC CE shall be transmitted in full bytes, if the total number of buffer status information for legacy LCG and new LCG is odd, four reserved bits shall be added at the last of MAC CE.

In the first embodiment, the LCG is composed of LCs according to priorities, which means that all of LCs in a particular LCG have the same priority configuration. The same priority configuration may mean the same priority. In the condition that the priorities of LCs are configured by the eNB, the same priority configuration may mean that there are multiple priorities for different LCs contained in a particular LCG. In this sense, the priority of a particular LCG means the highest priority of LC(s) contained in the particular LCG. The duplicated packet buffer status is related to a corresponding LCG that is composed of LC(s) that are necessary to be transmitted in duplication of the particular LCG. Therefore, the LC(s) that are necessary to be transmitted in duplication in the particular LCG also have the same priority configuration. In particular, all of the LCs are contained in LCG1, LCG2, LCG3 and LCG4 according to their priority configurations. That is, the LCs contained in the same LCG have the same priority configuration, and the LCs contained in different LCGs have different priority configurations. For example, the LCs (LC1, LC2, LC3 and LC4) contained in LCG1 have the highest priority LC, the LCs (e.g. LC5, LC6, LC7, . . . ) contained in LCG2 have the second highest priority LC, the LCs contained in LCG3 have the third highest priority LC, and the LCs contained in LCG4 have the lowest priority LC. Because the composition of the LCG does not consider the requirement of reliabilities in the first embodiment, the LC(s) of a particular LCG that are necessary to be transmitted in duplication may have different requirement of reliabilities.

In the following second and third embodiments, new LCGs will be composed according to different parameter or rule, such as reliabilities. For example, the LCs contained in LCG1, LCG2, LCG3 and LCG4 that are necessary to be transmitted in duplication may be recomposed into new LCG1, new LCG2, new LCG3 and new LCG4 according to the requirement of reliabilities. As another example, the LCs that are necessary to be transmitted in duplication may be recomposed into new LCGs according to eNB configuration. That is to say, the eNB will configure Which LCs that are necessary to be transmitted in duplication belong to which new LCG.

Figure 7:
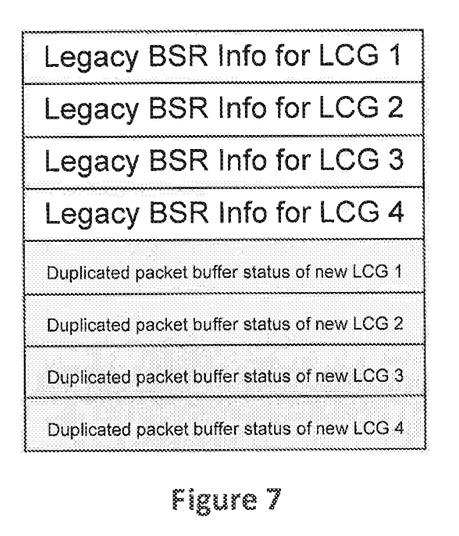
FIG. 7 is a schematic diagram illustrating a BSR MAC CE containing buffer status according to the second embodiment.

FIG. 7 is a schematic diagram illustrating a BSR MAC CE containing buffer status according to the second embodiment. In the second embodiment, duplicated packet buffer status of new LCGs is added after legacy BSR info of all LCGs. In this case, duplicated packet buffer status of one or multiple new LCGs can be reported, and the new LCG means that the logical channels can be grouped by different parameter or rule compared with LCG in legacy BSR.

Figure 8:
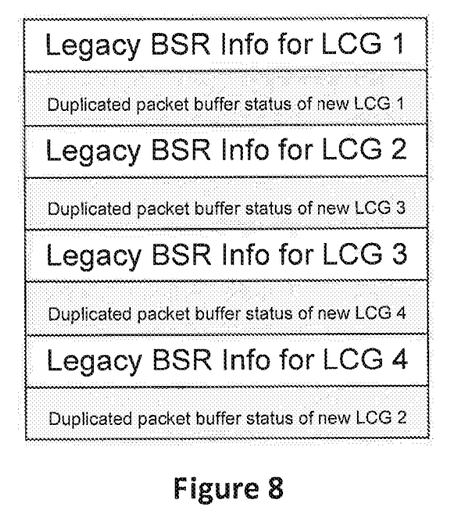
FIG. 8 is a schematic diagram illustrating a BSR MAC CE containing buffer status according to the third embodiment.

FIG. 8 is a schematic diagram illustrating a BSR MAC CE containing buffer status according to the third embodiment. In the third embodiment, new BS information and legacy BS information are prioritized according to the priority of the LCGs. The priority of new LCG is determined by the priority of the LCs contained in the new LCG.

Figure 9:
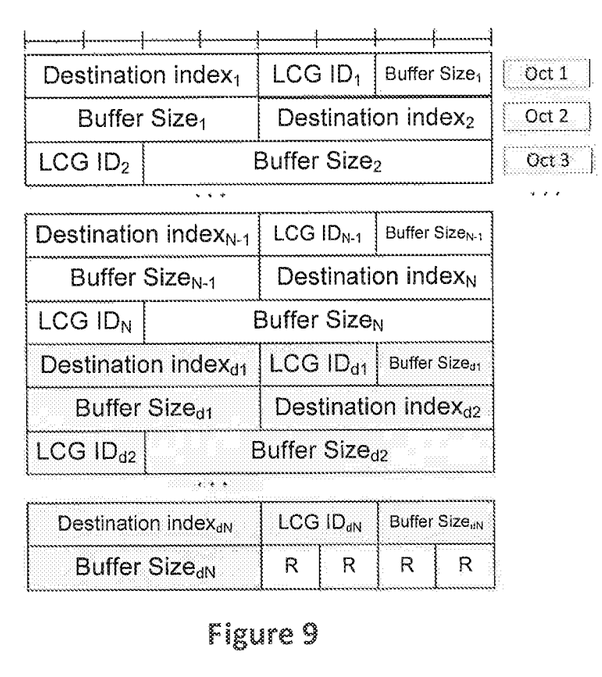
FIG. 9 is a schematic diagram illustrating a detailed BSR MAC CE format containing buffer status according to the second embodiment.
Figure 10:
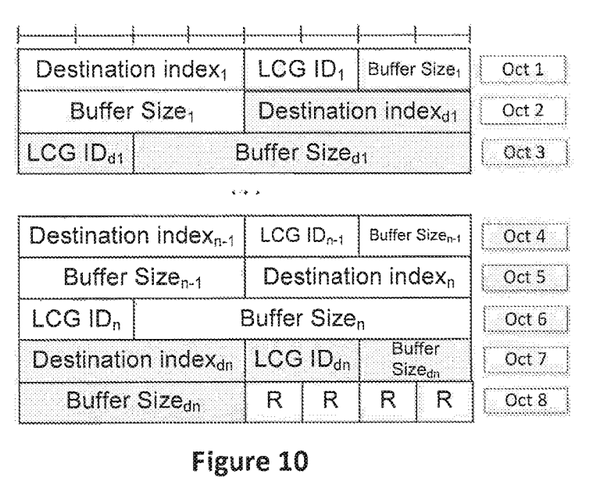
FIG. 10 is a schematic diagram illustrating a detailed BSR MAC CE format containing buffer status according to the third embodiment.

Similar to the first embodiment, in the second and third embodiments, both buffer status for the LCG and the corresponding LCG include destination index, LCG ID, buffer size fields, as shown in FIGS. 9 and 10.

The destination index of the buffer status for the LCG (such as Destination index$_1$ as shown in FIG. 9) is the same as the destination index of the buffer status for the corresponding new LCG (such as Destination index$_{d1}$ as shown in FIG. 9).

The LCG ID of buffer status for the corresponding new LCG is the ID of new LCG, and can be configured by eNB.

The buffer size of the buffer status for the LCG (such as Buffer Size$_1$ as shown in FIG. 9) indicates a total amount of data available for transmission across all of logical channels in the LCG. Similarly, the buffer size of the buffer status for the new LCG (which can be also referred to as the corresponding LCG, or the corresponding new LCG) (such as Buffer Size$_{d1}$ as shown in FIG. 9) indicates a total amount of duplicated data available for transmission across all of logical channels that have activated duplication in the new logical channel group.

In the second and third embodiment, the eNB, when receiving a particular destination index for the first time, knows that the following buffer size is for the "Legacy BSR info", and when receiving the particular destination index for the second time, knows that the following buffer size is for the "duplicated packet buffer status". Thus, all of the LCs in a new LCG should have the same destination. This means that all of LCs in the new LCG should come from the same legacy LCG and also have the same requirement of reliability configuration.

The same reliability configuration may mean the same reliability. For example, suppose that the legacy LCG is composed of LC1, LC2, LC3 and LC4, in which LC1 and LC2 have the highest requirement of reliability, LC3 has the second highest requirement of reliability, and LC4 has the lowest requirement of reliability. In addition, suppose that, according to the requirement of reliabilities, the packets transmitted on LC1, LC2 and LC3 should be transmitted in duplication. Therefore, LC1 and LC2, that have the same requirement of reliability, will compose new LCG1, while LC3 will compose new LCG2.

Similar to the first embodiment in which all of LCs in a particular LCG have the same priority configuration, in the second and third embodiments, all of LCs in a particular new LCG have the same reliability configuration. That is to say, in the condition that the eNB configures which LCs belong to which new LCG in consideration of reliabilities, the eNB may configure LCs with different reliabilities into the same new LCG. Therefore, the same reliability configuration may mean that there are multiple reliabilities for different LCs contained a particular new LCG. In this sense, the reliability of a particular new LCG means the highest reliability of LC(s) contained in the particular new LCG.

Assuming the priority order for legacy LCG 1-4 is {1, 2, 3, 4} and the priority order for new LCG 1-4 is (1, 4, 2, 3), the 13S information is prioritized as shown in FIG. 8.

Similar to the first embodiment, in the second and third embodiments, duplicated packet buffer status is only present when there are available duplicated packets for transmission in activated duplicated logical channel in the corresponding new LCG.

FIG. 9 shows the detailed implementation of BSR MAC CE format containing buffer status of the duplicated packet of the second embodiment. FIG. 10 shows the detailed implementation of BSR MAC CE format containing buffer status of the duplicated packet of the third embodiment.

Both FIGS. 9 and 10 shows that four reserved bits are added at the end of the MAC CE. In the condition that the total number of BS information for legacy LCG and new LCG is odd, four reserved bits are necessary to be added at the end of the MAC CF. The maximum number of each of legacy LCG and new LCG is 4. This means that either the number of the legacy LCG or the number of the new LCG may be 1, 2, 3 or 4. Therefore, depending on the number of legacy LCG and new LCG being odd or even, the total number of legacy LCG and new LCG may be odd or even. That is, there are four cases: even+odd→odd; even+even→even, odd+odd→even, odd+even→odd.

Repeated value of destination index implies the BS information is for duplicated to packet buffer status.

Similar to the first embodiment, if the number of bits the UL grant is not enough for the size of a MAC CE for reporting buffer status, it is preferable to report a truncated BSR containing as much buffer status as possible, unless buffer status for both the LCG and the corresponding new LCG cannot be contained together. The selection of the legacy LCG and new LCG are based on the decreasing priority order of the legacy LCG and the new LCG.

Figure 11:
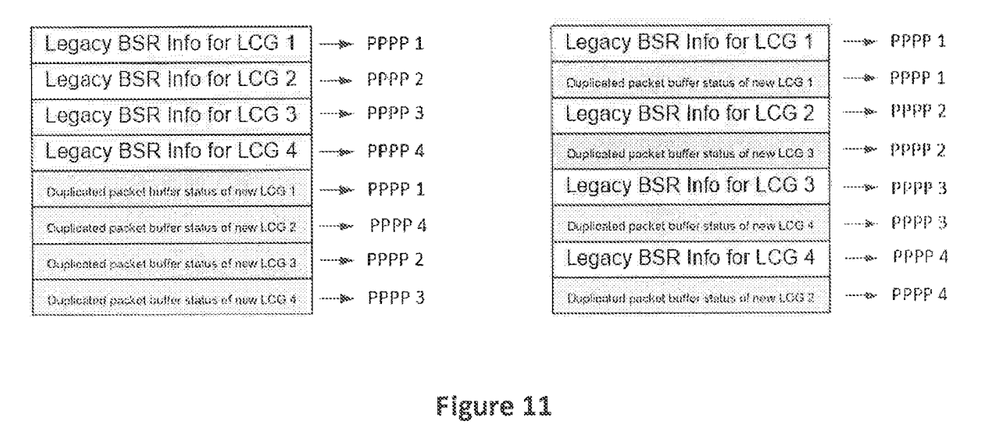
FIG. 11 is a schematic diagram illustrating truncated BSR rules according to the second and third embodiments.

For example, in the example shown in FIG. 11, if the full BSR information contains 12 bytes, but UL grant is only 6 bytes, then based on above rule, the following BS information in the figure is reported
1) Legacy BSR info for LCG1
2) Duplicated packet buffer status of new LCG 1
3) Legacy BSR info for LCG 2
4) Duplicated packet buffer status of new LCG 3.

Figure 12:
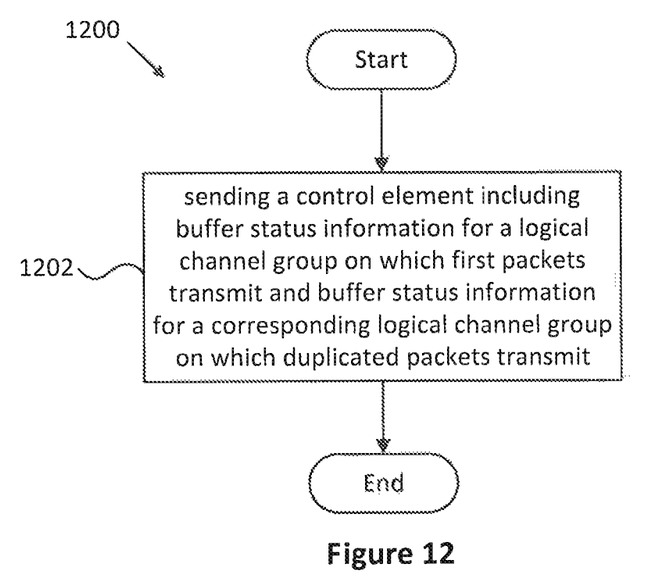
FIG. 12 is a schematic flow chart diagram illustrating an embodiment of a method for reporting buffer status.

FIG. 12 is a schematic flow chart diagram illustrating an embodiment of a method for reporting buffer status. In some embodiments, the method 1200 is performed by an apparatus, such as the remote unit 102. In certain embodiments, the Method 1200 may be performed by a processor executing program code, for example, a microcontroller, a microprocessor, a CPU, a GPU, an auxiliary processing unit, a FPGA, or the like.

The method 1200 may include 1202 sending a control element including buffer status information for a logical channel group on which first packets transmit and buffer status information for a corresponding logical channel group on which duplicated packets transmit.

In one embodiment, in the condition that the duplicated packets arrive at a buffer for at least one logical channel contained in the corresponding logical channel group, the buffer status information for the corresponding logical channel group is included. If the buffer status information for the logical channel group and the corresponding logical channel group do not fill full bytes of the control element, reserved bits are added to the control element. The logical channel group and the corresponding logical channel group are associated with the same ProSe destination.

In some embodiment, the control element includes buffer status information for a plurality of the logical channel groups on which the original packets transmit and buffer status information for a plurality of the corresponding logical channel groups on which the duplicated packets transmit. If the number of bits in the UL grant is not enough for the size of the buffer status information for both the plurality of the logical channel groups and the plurality of the corresponding logical channel groups, the control element includes as much buffer status information possible. In particular, if the buffer status information for only the logical channel group or only the corresponding logical channel group can be included in the control element, the buffer status information for both the logical channel group and the corresponding logical channel group are not included in the control element.

In some embodiment, logical channels are grouped into the corresponding logical channel groups according to service priority. The buffer status information for the corresponding logical channel group includes destination index, LCG ID, and buffer size. The destination index of the buffer status information for the corresponding logical channel group is the same as destination index of the buffer status information for the logical channel group with the same priority. The LCG ID of the buffer status information for the corresponding logical channel group is the same as LCG ID of the buffer status information for the logical channel group with the same priority. The buffer size of the buffer status information for the corresponding logical channel group indicates a total amount of duplicated data available for transmission across all of logical channels that have activated duplication in the logical channel group.

In some embodiment, logical channels are grouped into the corresponding logical channel groups according to service reliability. In the control element, the buffer status information for all of the corresponding logical channel groups are positioned after the buffer status information for all of the logical channel groups. In the control element, the buffer status information for the logical channel groups and the corresponding logical channel groups are prioritized according to service priorities of the logical channel groups and the corresponding logical channel groups. In particular, the buffer status information for the logical channel group and the corresponding logical channel group with higher service priority are positioned in front, and the buffer status information for the logical channel group is positioned in front of the buffer status information for the corresponding logical channel group with the same service priority. The buffer status information for the corresponding logical channel group includes destination index, LCG ID, and buffer size. The destination index of the buffer status information for the corresponding logical channel group is the same as destination index of the buffer status information for the logical channel group with the same priority. The buffer size of the buffer status information for the corresponding logical channel group indicates a total amount of duplicated data available for transmission across all of logical channels that activated duplication in the logical channel group. The LCG ID of the buffer status information for the corresponding logical channel group is based on eNB configuration.

In some embodiment, logical channels are grouped into the corresponding logical channel groups according to eNB configuration.

Figure 13:
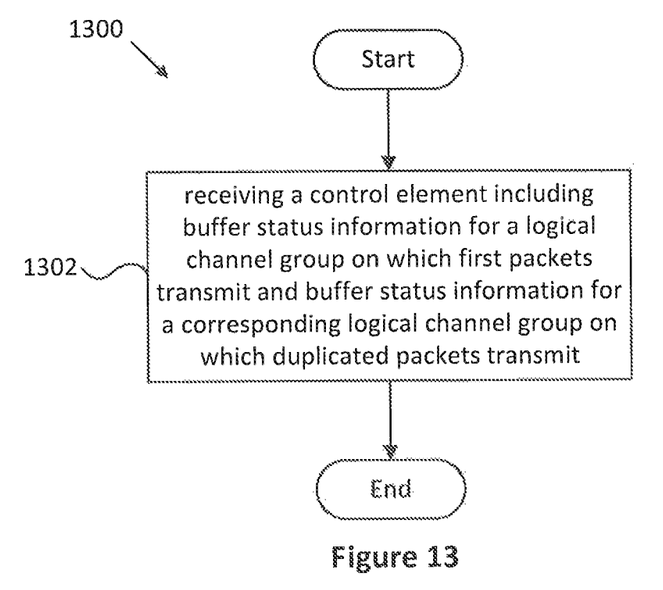
FIG. 13 is a schematic flow chart diagram illustrating a further embodiment of a method for reporting buffer status.

FIG. 13 a schematic flow chart diagram illustrating a further embodiment of a method 1300 for reporting buffer status. In some embodiments, the method 1300 is performed by an apparatus, such as the base unit 104. In certain embodiments, the method 1300 may be performed by a processor executing program code, for example, a microcontroller, a microprocessor, a CPU, a GPU, an auxiliary processing unit, a FPGA, or the like.

The method 1300 may include 1302 receiving a control element including buffer status information for a logical channel group on which first packets transmit and buffer status information for a corresponding logical channel group on which duplicated packets transmit.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
sending, by the UE, a medium access control control element (MAC CE) including a buffer status information indicating a logical channel group on which first packets transmit and the buffer status information indicating all of the logical channels having activated packet duplication in the logical channel group;
wherein the MAC CE includes the buffer status information indicating a plurality of logical channel groups via which original packets transmit and the buffer status information indicating a plurality of logical channels having activated packet duplication in the logical channel group;
wherein different logical channel groups of the plurality of logical channel groups are grouped:
according to destinations for packet transmissions on the different logical channel groups; and
in consideration of a service reliability configuration; and
wherein a first logical channel group identifier (LCG ID) in the MAC CE indicates the original packets and a second LCG ID in the MAC CE indicates duplicated packets.

2. The method of claim 1, wherein, if the buffer status information indicating the logical channel group and indicating all of the logical channels having activated packet duplication in the logical channel group do not fill full bytes of the MAC CE, reserved bits are added to the MAC CE.

3. The method of claim 1, wherein the logical channel group and the logical channels having activated packet duplication in the logical channel group are associated with at least one proximity-based service (ProSe) destination of the first packets.

4. The method of claim 1, wherein the buffer status information indicating all of the logical channels having activated packet duplication in the logical channel group includes a destination index, a corresponding LCG ID, and a buffer size.

5. The method of claim 4, wherein the destination index of the buffer status information indicating all of the logical channels having activated packet duplication in the logical channel group is the same as a second destination index of the buffer status information indicating the logical channel group having a same priority configuration.

6. The method of claim 4, wherein the corresponding LCG ID of the buffer status information indicating all of the logical channels having activated packet duplication in the logical channel group is the same as the second LCG ID of the buffer status information indicating the logical channel group having a same priority configuration.

7. The method of claim 4, wherein the buffer size of the buffer status information indicating all of the logical channels having activated packet duplication in the logical channel group indicates a total amount of duplicated data available for transmission across all of logical channels having activated duplication in the logical channel group.

8. The method of claim 1, wherein, in the MAC CE, the buffer status information indicating all of the logical channels having activated packet duplication in the logical channel group are positioned after the buffer status information indicating all of the logical channel groups.

9. The method of claim 1, wherein, in the MAC CE, the buffer status information indicating the logical channels having activated packet duplication in the logical channel group are prioritized according to service priorities.

10. A user equipment (UE), comprising:
at least one memory; and
at least one processor coupled with the at least one memory and configured to cause the UE to:
send a medium access control control element (MAC CE) including a buffer status information indicating a logical channel group on which first packets transmit and the buffer status information indicating all of the logical channels having activated packet duplication in the logical channel group;
wherein the MAC CE includes the buffer status information indicating a plurality of logical channel groups via which original packets transmit and the buffer status information indicating a plurality of logical channels having activated packet duplication in the logical channel group;
wherein different logical channel groups of the plurality of logical channel groups are grouped:
according to destinations for packet transmissions on the different logical channel groups; and
in consideration of a service reliability configuration; and
wherein a first logical channel group identifier (LCG ID) in the MAC CE indicates the original packets and a second LCG ID in the MAC CE indicates duplicated packets.

11. The UE of claim 10, wherein, if the buffer status information indicating the logical channel group and indicating all of the logical channels having activated packet duplication in the logical channel group do not fill full bytes of the MAC CE, reserved bits are added to the MAC CE.

12. The UE of claim 10, wherein the logical channel group and the logical channels having activated packet duplication in the logical channel group are associated with at least one proximity-based service (ProSe) destination of the first packets.

13. The UE of claim 10, wherein the buffer status information indicating all of the logical channels having activated packet duplication in the logical channel group includes a destination index, a corresponding LCG ID, and a buffer size.

14. The UE of claim 13, wherein the destination index of the buffer status information indicating all of the logical channels having activated packet duplication in the logical channel group is the same as a second destination index of the buffer status information indicating the logical channel group having a same priority configuration.

15. The UE of claim 13, wherein the corresponding LCG ID of the buffer status information indicating all of the logical channels having activated packet duplication in the logical channel group is the same as the second LCG ID of the buffer status information indicating the logical channel group having a same priority configuration.

16. The UE of claim 13, wherein the buffer size of the buffer status information indicating all of the logical channels having activated packet duplication in the logical channel group indicates a total amount of duplicated data available for transmission across all of logical channels having activated duplication in the logical channel group.

17. The UE of claim 10, wherein, in the MAC CE, the buffer status information indicating all of the logical channels having activated packet duplication in the logical channel group are positioned after the buffer status information indicating all of the logical channel groups.

18. The UE of claim 10, wherein, in the MAC CE, the buffer status information indicating the logical channels having activated packet duplication in the logical channel group are prioritized according to service priorities.

19. A base station, comprising:
at least one memory; and
at least one processor coupled with the at least one memory and configured to cause the base station to:
receive a medium access control control element (MAC CE) including a buffer status information indicating a logical channel group on which first packets transmit and the buffer status information indicating all of the logical channels having activated packet duplication in the logical channel group;
wherein the MAC CE includes the buffer status information indicating a plurality of logical channel groups via which original packets transmit and the buffer status information indicating a plurality of logical channels having activated packet duplication in the logical channel group;
wherein different logical channel groups of the plurality of logical channel groups are grouped:
according to destinations for packet transmissions on the different logical channel groups; and
in consideration of a service reliability configuration; and
wherein a first logical channel group identifier (LCG ID) in the MAC CE indicates the original packets and a second LCG ID in the MAC CE indicates duplicated packets.

20. A processor for wireless communication, comprising:
at least one controller coupled with at least one memory and configured to cause the processor to:
send a medium access control control element (MAC CE) including a buffer status information indicating a logical channel group on which first packets transmit and the buffer status information indicating all of the logical channels having activated packet duplication in the logical channel group;
wherein the MAC CE includes the buffer status information indicating a plurality of logical channel groups via which original packets transmit and the buffer status information indicating a plurality of logical channels having activated packet duplication in the logical channel group;
wherein different logical channel groups of the plurality of logical channel groups are grouped:
according to destinations for packet transmissions on the different logical channel groups; and
in consideration of a service reliability configuration; and wherein a first logical channel group identifier (LCG ID) in the MAC CE indicates the original packets and a second LCG ID in the MAC CE indicates duplicated packets.

* * * * *